(12) United States Patent
Graf et al.

(10) Patent No.: US 9,033,721 B2
(45) Date of Patent: May 19, 2015

(54) ELECTRICAL CONNECTING ELEMENT

(71) Applicant: Promet AG, Kirchberg (CH)

(72) Inventors: Roger Graf, Bichelsee (CH); Debra M. Bennett, Parker, CO (US)

(73) Assignee: Promet AG, Kirchberg (CH)

( * ) Notice: Subject to any disclaimer, the term of this patent is extended or adjusted under 35 U.S.C. 154(b) by 169 days.

(21) Appl. No.: 13/668,576

(22) Filed: Nov. 5, 2012

(65) Prior Publication Data

US 2014/0127955 A1 May 8, 2014

(51) Int. Cl.
*H01R 4/60* (2006.01)
*H02B 1/20* (2006.01)
*H02B 1/32* (2006.01)

(52) U.S. Cl.
CPC ... *H02B 1/20* (2013.01); *H02B 1/32* (2013.01)

(58) Field of Classification Search
USPC ........ 439/212, 213; 174/68.2, 70 B; 361/611, 361/624, 637–639
See application file for complete search history.

(56) References Cited

U.S. PATENT DOCUMENTS

| 8,235,732 | B2 * | 8/2012 | Garascia et al. ............. 439/76.2 |
| 8,337,251 | B2 * | 12/2012 | Ecker ....................... 439/620.27 |
| 2010/0012345 | A1 | 1/2010 | Kumar et al. |
| 2010/0319958 | A1 | 12/2010 | Latimer |
| 2013/0068495 | A1 * | 3/2013 | Hadi et al. .................... 174/68.2 |

FOREIGN PATENT DOCUMENTS

| DE | 102009031659 | 1/2010 |
| DE | 102011013157 | 8/2012 |
| JP | 2006261100 | 9/2006 |
| KR | 10185284 | 11/2011 |
| WO | 2012008365 | 1/2012 |

* cited by examiner

*Primary Examiner* — Khiem Nguyen
(74) *Attorney, Agent, or Firm* — Volpe and Koenig, P.C.

(57) ABSTRACT

An electrical connecting element (1') includes an integral, electrically conductive profile body having at least two deformation regions which are arranged successively in the longitudinal direction and in which the profile body is deformed differently.

7 Claims, 1 Drawing Sheet

ELECTRICAL CONNECTING ELEMENT

BACKGROUND

The subject of the invention is an electrical connecting element and a method for producing same.

In apparatus and installation construction in particular where high electrical currents need to be conducted, busbars consisting of solid copper or aluminum or composite rails are used. Examples of this are distribution cabinets and switchgear cabinets, emergency power supply systems, inverters, converters or the like. Such electrical connections between two spatial points can generally not be implemented as direct linear connections. When arranging conductors, the respective spatial conditions, obstacles and possibly other boundary conditions need to be taken into consideration. Connecting lines can cover a plurality of regions with different alignments of the conductor track. It is known to combine such connecting lines from a plurality of busbar sections. Each of these sections can be bent one or more times, with the bending axes of these deformations all having the same alignment. The individual sections are then screwed together to give the desired design, with the ends of adjacent sections overlapping one another. In the case of such conventional connecting lines, the routing of the lines cannot be selected optimally. As a result of this and as a result of the mutually overlapping regions of the conductor sections, the amount of material that is required and correspondingly the material costs and the weight are undesirably high. The costs for screwing together the individual busbar sections are likewise comparatively high.

SUMMARY

One object of the present invention is therefore to provide a busbar or an electrical connecting line for connecting two spatial points which uses comparatively less conductor material and can be produced comparatively inexpensively.

This object is achieved by an electrical connecting element and by a method for producing same in accordance with the invention.

BRIEF DESCRIPTION OF THE DRAWINGS

The invention will be described below in more detail with reference to some figures, in which.

DETAILED DESCRIPTION OF THE PREFERRED EMBODIMENTS

Figure 1:
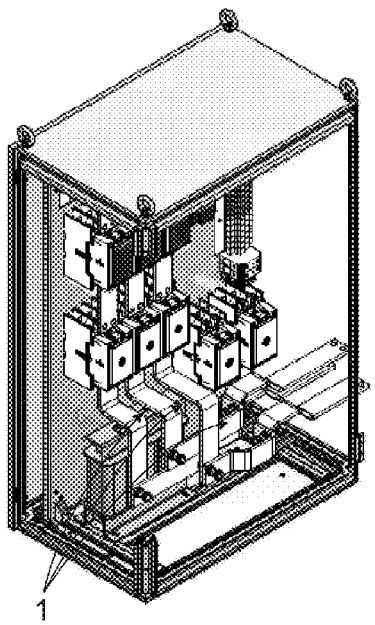
FIG. 1 shows a first assembly with connecting elements comprising assembled busbar sections (prior art)
Figure 2:
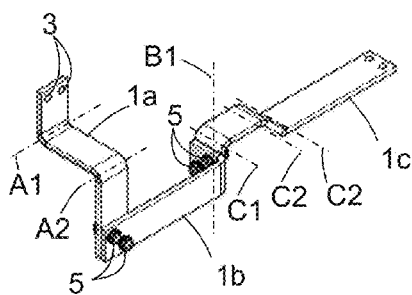
FIG. 2 shows a connecting element for the assembly shown in FIG. 1 (prior art)

FIG. 1 shows a first assembly with a plurality of connecting elements 1 in accordance with the prior art. One of these connecting elements 1 is illustrated in detail in FIG. 2. This connecting element comprises three sections 1a, 1b, 1c of a busbar with an approximately rectangular cross section. Each of these sections 1a, 1b, 1c is manufactured from a strip-like conductor piece which is bent one or more times. The bending radii can be, for example, of an order of magnitude of between the thickness and the width of the conductor pieces. Each of the sections 1a, 1b, 1c is split into two or more straight subsections by the bends. The bending axes A1, A2, B1, C1, C2, C3 are all orthogonal to the longitudinal direction and are aligned in the direction of the broad side of the respective section. In the case of relatively large conductor cross sections, the influence of the deformation on parameters such as the total length of the conductor, for example, can be difficult to monitor. This applies in particular to copper conductors. Therefore, all deformations in the individual sections 1a, 1b, 1c have the same form, preferably about axes which are aligned parallel to the broad side and orthogonal to the local longitudinal direction of the conductor piece. The lengths of the individual sections 1a, 1b, 1c are small in comparison with the total length of the connecting element 1. In each case two bores 3 are formed at the two ends of each section 1a, 1b, 1c. Depending on the dimensions or current flow, this hole pattern changes in accordance with EN43670. The ends of in each case two adjacent sections 1a, 1b, or 1b, 1c overlap one another, and these sections 1a, 1b or 1b, 1c are connected to one another in pairs by means of screws 5 passed through the bores 3. The longitudinal directions or the interconnected limbs of adjacent sections 1a, 1b or 1b, 1c are aligned orthogonal to one another.

Figure 3:
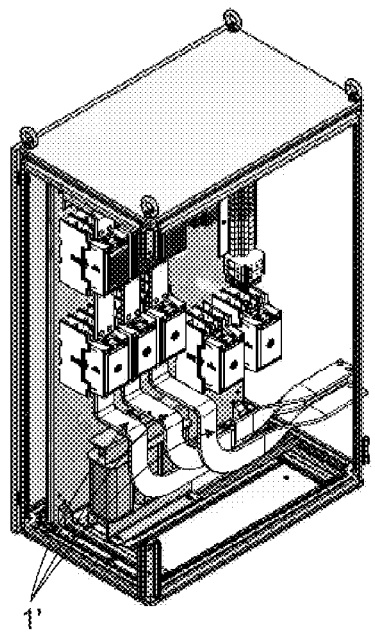
FIG. 3 shows a second assembly with integrally manufactured connecting elements.
Figure 4:
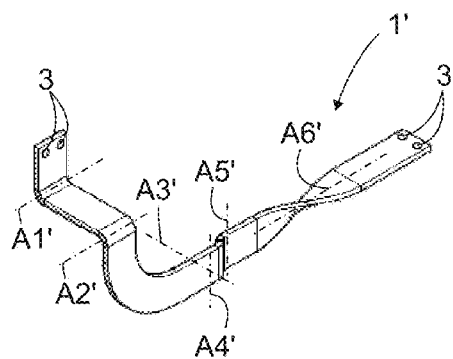
FIG. 4 shows a connecting element for the assembly shown in FIG. 2 [sic. 3].

FIG. 3 shows a second assembly, which differs from the first assembly in terms of differently designed connecting elements 1'. One of these connecting elements 1' is illustrated in detail in FIG. 4. This connecting element is manufactured from a homogeneous or integral profile body with preferably an at least approximately rectangular cross section. The thickness of the profile body is greater than or equal to 2.5 mm and less than or equal to 120 mm. The width of the profile body is greater than or equal to 10 mm and less than or equal to 120 mm. The total length of the profile body can be up to 4 m or at most up to 6 m. The cross-sectional area of the profile body is greater than or equal to 25 mm² and the electrical conductivity thereof is greater than or equal to 25 m ($\Omega$ mm²).

The originally straight profile body is deformed a plurality of times in different ways. It covers a plurality of straight or planar subregions which are aligned differently. Starting from the left-hand end, a 90° bend in the counter clockwise direction about a first axis A1' follows the first straight subsection. The first axis A1' is aligned orthogonal to the longitudinal direction and in the width direction of the profile body. The inner bending radius or the bending radius of that side of the profile body which faces the bending axis A1' is preferably between half and two times the profile body thickness. Similarly, a region with a bend through 90° in the clockwise direction about a second axis A2' is formed between the second and third straight subsections, with the second axis A2' being aligned parallel to the first axis A1'. The profile body is deformed by vertical bending through 90° about a third axis A3' between the third and fourth straight subsection. The third axis A3' is orthogonal to the first axis A1' and to the broad side of the profile body. The inner bending radius or the radius of the inner edge of the profile body is preferably between half and two times the profile body width. Two bends in the manner of the first two bends with the opposite sense of rotation about a fourth axis A4' and a fifth axis A5' follow one another directly after the fourth straight subsection. The associated bending angles have a magnitude of approximately 45°. The axes A4' and A5' are orthogonal to the longitudinal direction of the profile body at this point and parallel to the broad side of the profile body. The deformed profile body covers a region with twisting through 90° with a positive direction of rotation about a sixth axis A6' or about the longitudinal axis of the profile body at this point between an adjoining further straight subsection and the last straight subsection. The profile body therefore has a plurality of different deformations such as bends, vertical bends or twisting distributed over its longitudinal extent. The number, type and arrangement of such deformations can be fixed individually for each connecting element 1'. The deformation axes A1', A2', A3', A4', A5' A6' can have any desired orientations in three-dimensional space in the region of the subregion of the profile body to be deformed, in particular in the direction of the length, the width or the depth of the profile body in the region to be deformed. The deformations can be implemented in order from one end to the other end of the profile body by correspondingly designed bending apparatuses. Alternatively, any other desired sequence of deformations can also be predetermined. In order to produce a connecting element which is intended to connect a first spatial point to a second spatial point in the three-dimensional space, the parameters required for controlling the deformation apparatuses (not illustrated) need to be determined. On the basis of presets such as type of material, width and thickness of profile body, coordinates of the first spatial point and second spatial point, details in respect of the desired routing and/or details in respect of blocking zones for the connecting element 1', a calculation apparatus (not illustrated) determines the parameters required for producing the connecting element 1'. These include, for example, the total length of the profile body to be deformed, the number, type and arrangement of the required deformations and preferably the sequence of the deformations which are intended to be implemented successively. The different deformations can be performed successively at correspondingly equipped deformation stations. In order that the deformations are matched to one another, preferably reference positions on the profile body are defined which can be taken into consideration by the deformation apparatuses. Alternatively, the deformation apparatuses can also be combined in a common deformation installation, wherein the workpiece can be moved automatically in a defined manner between the deformation apparatuses.

Following or prior to the deformations the connecting element 1' can optionally be sheathed completely or partially with an electrical insulating layer.

Key for Reference Symbols
1, 1' Connecting element
1*a*, 1*b*, 1*c* Busbar sections
3 Bore
5 Screw

The invention claimed is:

1. An electrical connecting element (1') for low-loss conduction of electrical current in installations or appliances between a first spatial point and a second spatial point, comprising an integral, electrically conductive profile body having a uniform rectangular cross section with at least two deformation regions which are arranged successively in a longitudinal direction and in which the profile body is deformed differently and a plurality of straight or planar subregions which are aligned differently.

2. The electrical connecting element (1') as claimed in claim 1, wherein the profile body is a bar or strip, having a cross-sectional area that is greater than or equal to 25 mm$^2$ and having a conductivity that is greater than or equal to 25 m/($\Omega$ mm$^2$).

3. The electrical connecting element (1') as claimed in claim 2, wherein the profile body is manufactured from copper or aluminum or an alloy of copper or aluminum or a composite of copper or aluminum.

4. The electrical connecting element (1') as claimed in claim 1, wherein the rectangular cross section has a minimum thickness of 2.5 mm, a minimum width of 10 mm and a total length of at most 6 m, and the deformation regions are deformations selected from the group consisting of bending, vertical bending, or twisting.

5. The electrical connecting element (1') as claimed in claim 1, wherein the profile body comprises connecting regions at ends thereof formed as bores (3) or other connecting elements.

6. The electrical connecting element (1') as claimed in claim 5, wherein the deformed profile body is sheathed by an electrical insulator at least between the connecting regions.

7. A method for producing an electrical connecting element (1') as claimed in claim 1, comprising defining a design for the connecting element (1') which is required for connecting spatial points, determining a required length of the profile body taking into consideration the deformations to be performed, cutting the profile body to said required length and deforming the profile body corresponding to the design in one or more steps.

* * * * *